UNITED STATES PATENT OFFICE.

JOSEPH NEWTON, OF BENNETTSVILLE, SOUTH CAROLINA, ASSIGNOR OF ONE-HALF TO HOPE H. NEWTON, OF SAME PLACE.

MEDICINAL TONIC PILL.

SPECIFICATION forming part of Letters Patent No. 244,474, dated July 19, 1881.

Application filed November 12, 1880. (No specimens.)

*To all whom it may concern:*

Be it known that I, JOSEPH NEWTON, a citizen of the United States, resident at Bennettsville, county of Marlborough, State of South Carolina, have invented a new and useful Compound of Matter to be Used as a Medicinal Tonic, of which the following is a specification.

My composition consists of the following ingredients combined in equal proportions of weight, viz., sulphureted iron, capsicum, ginger-root, wild-cherry bark, golden seal. These ingredients are all to be ground to a dry fine powder. All but the golden seal are then to be thoroughly mixed by stirring, and then to be worked up to a stiff cohesive paste by the introduction of honey or sirup into the dry mixture. The paste is then to be divided into lumps of two and two-fifths grains each and rolled in the powdered golden seal till three-fifths of a grain of the powder is taken up and adheres to each pill.

In using the above-named composition one pill should be taken three times a day by an adult in a moderate state of debility, the dose being diminished for young children or increased to not exceeding two pills in severe cases of debility or dyspepsia.

What I claim, and desire to secure by Letters Patent of the United States, is—

The herein-described composition of matter to be used as a medicinal tonic, consisting of sulphureted iron, capsicum, ginger-root, wild-cherry bark, and golden seal, in the proportions stated.

In testimony whereof I hereunto affix my sign-manual in presence of two subscribing witnesses.

JOSEPH NEWTON.

Witnesses:
 THOMAS E. DUDLEY,
 HOPE H. NEWTON.